(12) United States Patent
Schrage

(10) Patent No.: US 8,684,873 B2
(45) Date of Patent: Apr. 1, 2014

(54) DRIVE SYSTEM AND METHOD FOR OPERATING SUCH A DRIVE SYSTEM, IN PARTICULAR FOR A MOTOR VEHICLE

(75) Inventor: Henrik Schrage, Weinsberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 239 days.

(21) Appl. No.: 13/024,677

(22) Filed: Feb. 10, 2011

(65) Prior Publication Data

US 2011/0212801 A1 Sep. 1, 2011

(30) Foreign Application Priority Data

Feb. 26, 2010 (DE) .......................... 10 2010 010 435

(51) Int. Cl.
*F16H 3/72* (2006.01)
*F16H 37/06* (2006.01)

(52) U.S. Cl.
USPC .................................. 475/5; 74/329; 74/330

(58) Field of Classification Search
USPC ................. 475/5, 207, 218; 74/329, 330, 339
See application file for complete search history.

(56) References Cited

U.S. PATENT DOCUMENTS

| 6,896,641 | B2 * | 5/2005 | Matsumura et al. .......... 477/115 |
| 7,249,537 | B2 | 7/2007 | Lee et al. |
| 7,604,565 | B2 | 10/2009 | Lee et al. |
| 7,611,433 | B2 | 11/2009 | Forsyth |
| 2002/0033059 | A1 * | 3/2002 | Pels et al. .......... 74/329 |
| 2003/0069103 | A1 | 4/2003 | Ibamoto et al. |
| 2007/0157899 | A1 | 7/2007 | Seufert et al. |
| 2007/0259748 | A1 * | 11/2007 | Forsyth ............ 475/5 |
| 2007/0265126 | A1 * | 11/2007 | Janson et al. ........ 475/5 |
| 2009/0090571 | A1 | 4/2009 | Tanba |
| 2009/0105042 | A1 | 4/2009 | Tanba |
| 2012/0281951 | A1 | 11/2012 | Takahashi et al. |

FOREIGN PATENT DOCUMENTS

| DE | 19950679 | 4/2001 |
| DE | 102005049992 | 4/2007 |
| DE | 102006036758 | 2/2008 |
| JP | 2003-237393 | 8/2003 |
| JP | 2008-121526 | 5/2008 |
| JP | 2009248730 | 10/2009 |
| WO | 2008/046185 | 4/2008 |
| WO | 2009021574 | 2/2009 |

* cited by examiner

*Primary Examiner* — Erin D Bishop
*Assistant Examiner* — Huan Le
(74) *Attorney, Agent, or Firm* — Gerald E. Hespos; Michael J. Porco; Matthew T. Hespos

(57) ABSTRACT

A drive system (1) for a motor vehicle has a double clutch transmission (2), with two component transmissions (3, 4), a double clutch (5) and an output shaft (6). An internal combustion engine (7) optionally can be connected operatively to one of the component transmissions (3, 4) via the double clutch (5) to drive the output shaft (6). A gear drive (8) is arranged rotatably on the output shaft (6). An electric machine (9) can be connected operatively via the gear drive (8) to at least one fixed gear (16, 17, 21) of one of the component transmissions (3, 4) to drive the output shaft (6) and/or to recover kinetic energy from the drive system (1).

12 Claims, 6 Drawing Sheets

US 8,684,873 B2

DRIVE SYSTEM AND METHOD FOR OPERATING SUCH A DRIVE SYSTEM, IN PARTICULAR FOR A MOTOR VEHICLE

CROSS-REFERENCE TO RELATED APPLICATION

This application claims priority under 35 USC 119 to German Patent Application No. 10 2010 010 435.3, filed on Feb. 26, 2010, the entire disclosure of which is incorporated herein by reference.

BACKGROUND OF THE INVENTION

1. Field of the Invention

The invention relates to a drive system and to a method for operating such a drive system, in particular for a motor vehicle.

2. Description of the Related Art

The invention can be applied to any vehicle, but the invention and the problems on which the invention is based will be explained in more detail with respect to a passenger car.

A hybrid vehicle generally is considered a vehicle with a drive system that uses a plurality of drive units, such as an internal combustion engine and an electric motor. Parallel hybrid drives usually should be used to generate the highest possible energetic efficiency. A parallel hybrid drive permits the electric motor and the internal combustion engine to apply torque to a transmission either alternatively or cumulatively. Furthermore, the electric motor can be as a generator. For example, brake energy is present in the form of kinetic energy when the vehicle is braked and can be recovered and used, for example, to charge electric energy stores. Frequent starting and acceleration that occur, for example, in road traffic, preferably are carried out or assisted by the electric motor in a hybrid motor vehicle because the operation of the internal combustion engine with frequent load changes results in increased fuel consumption and emissions of pollutants. In contrast to an internal combustion engine, an electric motor already has a high torque at low engine speeds, practically from the stationary state. As a result, an electric motor is suited particularly well for starting and acceleration processes. In contrast, an internal combustion engine can be operated with high efficiency only at its rated rotational speed, for example in the case of constant fast travel. To combine the advantages of an internal combustion engine with the advantages of an electric motor, it is therefore necessary to configure the drive system structurally in such a way that both the power of the internal combustion engine and the power of the electric motor can be input into the drive system.

U.S. Pat. No. 7,611,433 B2 describes a hybrid drive system for a motor vehicle having a double clutch transmission that has two component transmissions and one output shaft connected to the component transmissions via gearwheel stages. An electric machine arranged axially with respect to the output shaft can be connected to one end of the output shaft via an additional clutch. WO 2008/046185 A1 describes a further structural design of a hybrid drive system with an internal combustion engine and an electric motor. The electric motor is arranged axially with respect to an output shaft and can be connected to the output shaft via a clutch. These two designs require a large amount of axial space due to the arrangement of the electric motor. Furthermore, when the clutch assigned to the electric motor closes, the electric motor is connected directly to the drive axle of the vehicle via the output shaft. The drive axle rotates as soon as the electric motor is activated. It therefore is not possible to activate the electric motor in the stationary state of the vehicle, for example to start the internal combustion engine.

US 2003/0069103 A1 discloses a hybrid drive system for a motor vehicle with an automated conventional transmission, an internal combustion engine and an electric machine. The transmission has two component transmissions that optionally transmit the torque of the internal combustion engine to an output shaft. The electric machine is coupled to the output shaft of the transmission via a gear stage. This arrangement permits activation of the electric motor in the stationary state of the vehicle.

An object of the invention is to provide an improved drive system and an improved method for operating a drive system to overcome the above-mentioned disadvantages.

SUMMARY OF THE INVENTION

The invention relates to a drive system for a motor vehicle. The drive system has a double clutch transmission with two component transmissions, a double clutch and an output shaft. An internal combustion engine optionally can be connected operatively to one of the component transmissions via the double clutch to drive the output shaft. A gear drive is arranged rotatably on the output shaft. An electric machine can be connected operatively via the gear drive to a fixed gear of one of the component transmissions to drive the output shaft and/or to recover kinetic energy from the drive system.

The invention also relates to method for operating a drive system that has a double clutch transmission with two component transmissions, a double clutch and an output shaft, and particularly a drive system for a motor vehicle. The method includes optionally operatively connecting an internal combustion engine to one of the component transmissions via the double clutch to drive the output shaft; and operatively connecting an electric machine to at least one fixed gear of one of the component transmissions via a gear drive that is arranged rotatably on the output shaft to drive the output shaft and/or to recover kinetic energy from the drive system.

The electric machine is connected operatively via a gear drive that is mounted rotatably on the output shaft to one of the component transmissions of the double clutch transmission to transmit a torque or to recover braking energy. In this context, the output shaft, which is present in any case, is used as a bearing point for the additional gear drive. As a result, additional components are not needed, such as an axis for providing support. An operative connection to an existing fixed gear of a component transmission can be provided via the gear drive, but an additional fixed gear is also possible.

The invention has an advantage over the above-mentioned prior art approaches in that a structurally simple coupling of the electric motor to one of the component transmissions of the double clutch transmission is implemented. Furthermore, the drive system of the invention enables the electric motor to be activated when the vehicle is stationary, for example to start the internal combustion engine, without the drive axle of the motor vehicle being moved. Furthermore, the electric machine advantageously can be operated as a generator by the internal combustion engine to charge an energy store, for example during a waiting phase at a traffic light.

The electric machine preferably is arranged parallel to the output shaft. This arrangement reduces axial installation space of the drive system and widens the field of application of the drive system.

One of the component transmissions preferably has gearwheels for uneven-numbered gear speeds, and the other component transmission preferably has gearwheels for even-numbered gear speeds of the double clutch transmission. This makes it possible to pre-select in the component transmission that is not currently connected to the internal combustion engine a gear speed to follow the gear speed that currently is shifted. Thus, a particularly fast shifting process is ensured.

The electric machine preferably can be connected operatively to the component transmission with the even-numbered gear speeds, for example to the fixed gear of a second gear speed. As a result, the first gear speed can be pre-selected in the stationary state of the motor vehicle, and the electric machine that is being operated as a generator can be driven by the internal combustion engine, for example, to charge a battery. As a result, the motor vehicle starts with no delay and accelerates quickly.

The gear drive may have a spur gear. As a result, a desired transmission ratio can be implemented in a structurally simple way.

The gear drive may have a planetary gear mechanism. Thus, an advantageous transmission ratio can be implemented with a low axial space requirement.

The planetary gear mechanism preferably is arranged coaxially with respect to an output shaft of the electric machine or coaxially with respect to the output shaft of the double clutch transmission. As a result a further reduction in the axial space requirement is achieved, which widens the field of application of the drive system.

The electric machine can be connected operatively to the internal combustion engine and can be used to start the internal combustion engine. Thus, a separate starter advantageously can be dispensed with, which entails advantages in terms of weight.

A clutch device preferably is provided for decoupling the electric machine from the drive system. Thus, the electric machine will not influence the synchronization of the second component transmission, which advantageously produces relatively short shifting times.

The electric machine preferably is connected operatively to a fixed gear of the component transmission which has even-numbered gear speeds of the double clutch transmission. The fixed gear may be embodied as a fixed gear of a second gear speed of the component transmission. As a result, it is possible to pre-select the first gear speed in the stationary state of the motor vehicle, and at the same time to drive the electric machine which is operated as a generator with the internal combustion engine, for example to charge a battery. An acceleration advantage therefore is obtained when the motor vehicle starts in the first gear speed of the double clutch transmission.

The electric machine may be connected operatively to the component transmission with the even-numbered gear speeds, to the fixed gear of a second gear speed. Therefore, no deceleration occurs when the motor vehicle starts, and as a result an acceleration advantage is obtained.

The electric machine may be connected operatively to the fixed gear via a spur gear and/or via a planetary gear mechanism. Thus, a desired transmission ratio between an electric machine and the component transmission can be attained in a comfortable fashion.

BRIEF DESCRIPTION OF THE DRAWINGS

The invention will be explained in more detail below on the basis of exemplary embodiments and with reference to the accompanying schematic figures of the drawing.

DETAILED DESCRIPTION OF PREFERRED EMBODIMENTS

Figure 1:
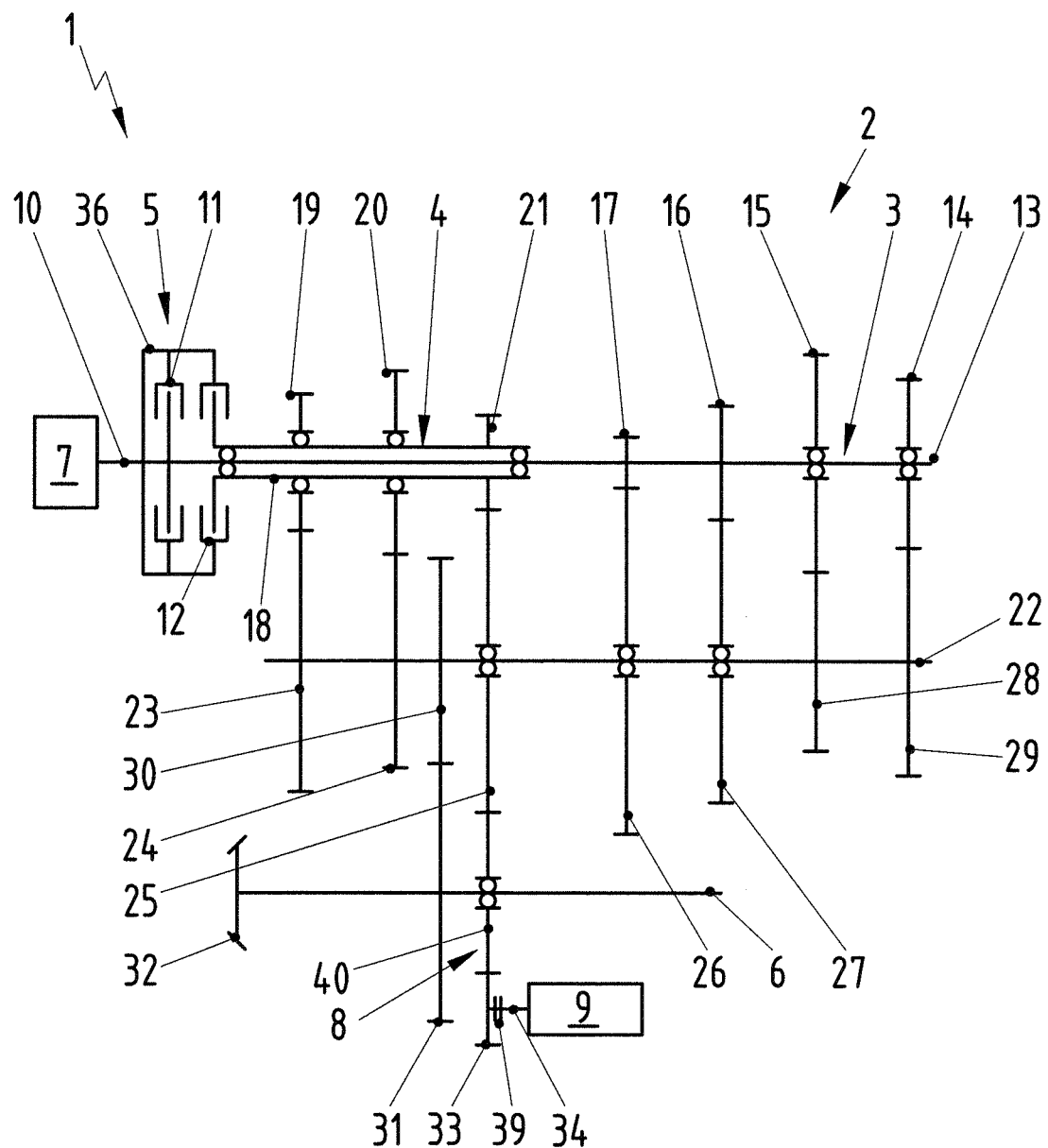
FIG. 1 is a plan view of a drive system according to a preferred embodiment of the invention.

FIG. 1 is a schematic view of a drive system 1 having a double clutch transmission 2, an internal combustion engine 7 and an electric machine 9. The electric machine 9 can be operated either as an electric motor or as a generator. In the present embodiment, the double clutch transmission 2 has seven forward gear speeds and one reverse gear speed. However, it is also possible to use any other desired number of gear speeds. In the text which follows, a freely moving gear is understood to be a gearwheel that is mounted rotatably on a shaft, and a fixed gear is understood to be a gearwheel that is secured on the shaft in a frictionally locking or positively locking fashion. A freely moving gear may be connected, for example, via a shifting sleeve to a shaft in a frictionally locking fashion. In the case of rotating shafts, adaptation of the rotational speed of the freely moving gear to the shaft is carried out by synchronization. The internal combustion engine 7 is connected in a frictionally locking fashion to a clutch housing 36 of a double clutch 5 via an output shaft 10. The double clutch 5 has a first clutch 11 and a second clutch 12 that are connected to the output shaft 10 of the internal combustion engine 7 via the clutch housing 36. The clutches 11, 12 are embodied here as wet-running multi-disk clutches. The output shaft 10 of the internal combustion engine 7 can be connected via the first clutch 11 to a solid shaft 13 of a first component transmission 3 of the double clutch transmission 2 in a frictionally locking fashion. The first component transmission 3 is assigned a group of transmission gear speeds, namely the uneven-numbered forward gears one, three, five and seven as well as the reverse gear speed. The reverse gear speed is not illustrated in FIG. 1. In the present example, the first gear speed is implemented with the gearwheel 17 and the third gear speed is implemented with the gearwheel 16 as fixed gears. On the other hand, the fifth gear speed is implemented with the gearwheel 14 and the seventh gear speed is implemented with the gearwheel 15 as freely moving gears on the solid shaft 13. One of the gearwheels 14 or 15 optionally can be secured on the solid shaft 13 of the first component transmission 3 via a shifting kinematic system (not illustrated) with a shifting sleeve and a synchronization means. The solid shaft 13 is mounted in a transmission housing (not illustrated).

A second component transmission 4 has a hollow shaft 18 that surrounds the solid shaft 13 of the first component transmission 3 and also is mounted in the transmission housing of the double clutch transmission 2. The hollow shaft 18 can be connected to the output shaft 10 of the internal combustion engine 7 in a frictionally locking fashion via the second clutch 12 of the double clutch 5. The double clutch 5 is embodied so that the first clutch 11, the second clutch 12, or neither of the two clutches 11, 12 optionally is closed. The first or the second component transmissions 3, 4, or neither of the component transmissions 3, 4, therefore can be connected operatively to the internal combustion engine 7. In FIG. 1, neither of the two clutches 11, 12 is closed. The hollow shaft 18 of the second component transmission 4 is assigned a second group of transmission gear speeds, namely the even-numbered gear speeds: two with the gearwheel 21, four with the gearwheel 19 and six with the gearwheel 20. The gearwheel 21 is embodied as a fixed gear and the gearwheels 19 and 20 are embodied as freely moving gears on the hollow shaft 18. One of the gearwheels 19 or 20 optionally can be connected to the hollow shaft 18 in a frictionally locking fashion via a shifting kinematic system (not illustrated) with a shifting sleeve and a synchronization means.

A main shaft 22 of the double clutch transmission 2 is parallel to the solid 13 and hollow shafts 13, 18 and is mounted in the transmission housing of the double clutch transmission 2. The main shaft 22 has gearwheels 23 to 29 engaged with the corresponding gearwheels 19 to 21 and 14 to 17 of the second and first component transmissions 4, 3 for implementing the desired transmission ratio. In this context, the gearwheels 23, 24, 28 and 29 of the fourth, sixth, seventh and fifth gear speeds are fixed gears on the main shaft 22 and each is assigned to a freely moving gear 14, 15 on the solid shaft 13 of the first component transmission 3 or a freely moving gear 19, 20 of the hollow shaft 18 of the second component transmission 4. The gearwheels 27, 26, 25 of the third, first and second gear speeds are freely moving gears and engage the corresponding fixed gears 16, 17 of the solid shaft 13 of the component transmission 3 or with the corresponding fixed gear 21 of the hollow shaft 18 of the component transmission 4. The freely moving gears 25-27 can be secured on the main shaft 22 in a frictionally locking fashion by shifting sleeves. The shaft 13, 18, 22 on which the freely moving gear of a pair of gearwheels is arranged will be determined by the installation space available for the double clutch transmission 2. Variants of structural and functional terms presented above are conceivable.

An output shaft 6 is arranged parallel to the main shaft 22 and is mounted in the transmission housing of the double clutch transmission 2. The output shaft 6 is connected operatively to the main shaft 22 via a pair of gearwheels 30, 31, which are embodied as fixed gears 30, 31 on the corresponding shafts 22, 6. The gearwheel 30 is assigned to the main shaft 22, and the gearwheel 31 is assigned to the output shaft 6. The transmission ratio of the pair of gearwheels is approximately 1 here. In the embodiment of FIG. 1, the gearwheels 30, 31 are disposed axially between the gearwheels 24, 25 of the sixth and second gear speeds. Alternatively, the gearwheels 30, 31 can be arranged at a different location depending on the available installation space in the axial direction of the main shaft 22. The output shaft 6 is located before a plane spanned by the main shaft 22 and the shafts 13, 18 of the first and second component transmissions 3, 4, and hence is offset laterally with respect to the shafts 13, 18, 22. For the sake of simplified illustration, the output shaft 6 is folded into the plane of the shafts 13, 18, 22 in FIG. 1. The output shaft 6 is connected operatively, for example via an obliquely toothed beveled gearwheel 32, to a drive axle (not illustrated) of the motor vehicle.

A gear drive 8 is arranged rotatably on the output shaft 6 and is engaged with the gearwheel 25 of the second component transmission 4. Alternatively, the gear drive 8 can be engaged with the gearwheels 26, 27 of one of the component transmissions 3, 4. In the illustrated embodiment, the gear drive 8 comprises a gearwheel 40, which is embodied as a freely moving gear 40 on the output shaft 6. A gearwheel 33 is arranged on an output shaft 34 of the electric machine 9 and is engaged with the gearwheel 40. A clutch device 39 is arranged between the gearwheel 33 and the electric machine 9 so that the electric machine 9 can be decoupled and is embodied, for example, as a dog clutch. The gearwheels 40, 14-17, 19-21, 23-31, 33 of the double clutch transmission 2 preferably are spur gears, and particularly spur gears with oblique toothing. Alternatively, other types of toothing can be used.

Figure 2:
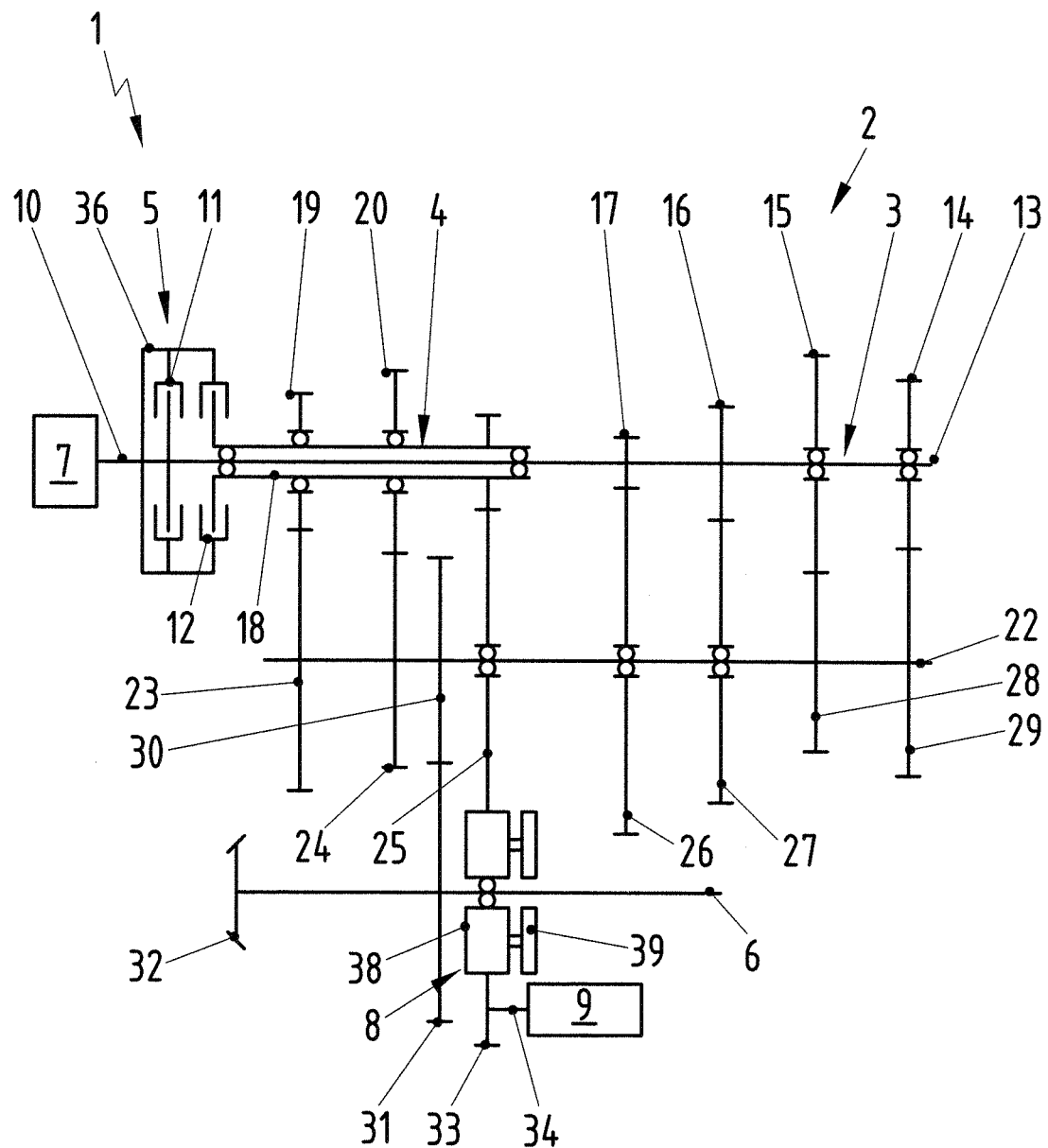
FIG. 2 is a plan view of a drive system according to a further preferred embodiment of the invention.

An alternative embodiment of the gear drive 8 is illustrated in FIG. 2. The gear drive 8 is embodied here as a planetary gear mechanism 38 and is arranged coaxially with respect to the output shaft 6. The planetary gear mechanism 38 also can be arranged coaxially with respect to the output shaft 34 of the electric machine 9. The planetary gear mechanism 38 permits a large range of transmission ratios to be covered with a very small installation space. The clutch device 39 is provided for decoupling the electric machine 9. In this embodiment, the clutch device 39 can be embodied so that a ring gear of the planetary gear mechanism 38 can be secured by a dog clutch for the decoupling the electric machine 9.

Figure 3:
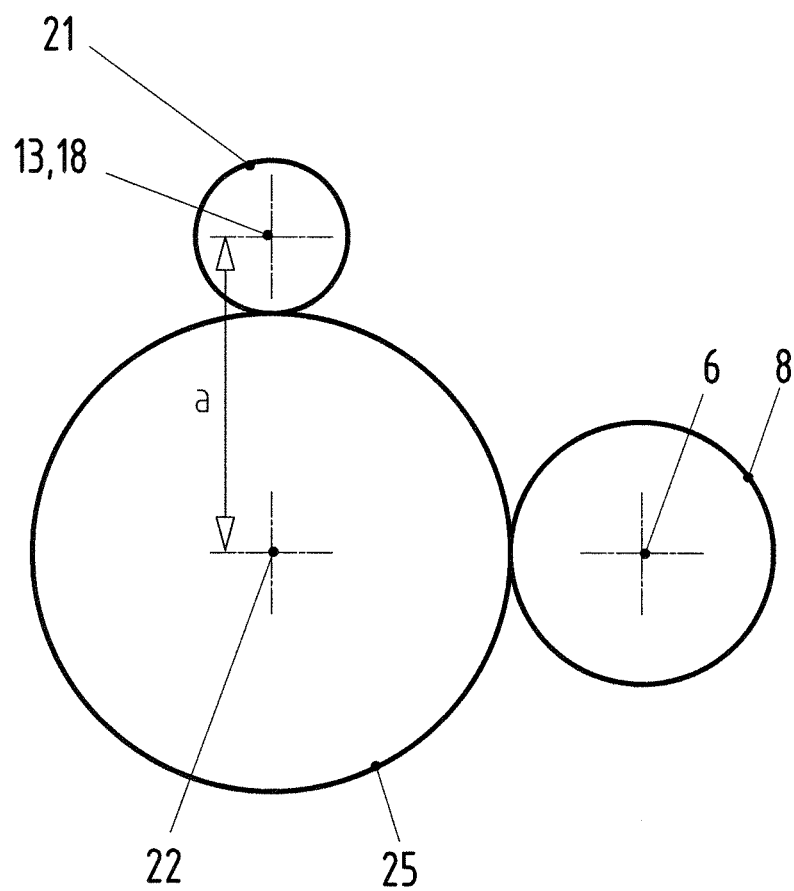
FIG. 3 is a side view of the drive system according to FIGS. 1 and 2.

FIG. 3 shows the drive system 1 in a schematic side view in the plane of the wheels 21 and 25 and looking away from the internal combustion engine 7. For simplicity, the electric machine 9 and the other gearwheels are not shown. The shafts 13, 18 of the first and second component transmissions 3, 4 span a plane with the main shaft 22. An axial distance a between the shafts 13, 18 and 23 is determined by the desired transmission ratio of the gear speeds and the available installation space. The output shaft 6 is offset laterally offset from the plane spanned by the shafts 13, 19 and 23. The output shaft 6 is arranged so that the gearwheels 30, 31 (not shown in FIG. 3), the gear drive 8 and the gearwheel 25 of the second component transmission 4 are in engagement.

The method of functioning of the drive system 1 is described briefly below. The output shaft 10 of the internal combustion engine 7 transmits the torque of the internal combustion engine 7 to the clutch housing 36 of the double clutch 5 and to the first and second clutches 11, 12. When the first clutch 11 closes, power flux is produced from the internal combustion engine 7 to the solid shaft 13 of the first component transmission 3. Depending on the gear speed selected at the first component transmission 3—this will be the first gear speed with the gearwheel 17 when the motor vehicle starts—the torque of the internal combustion engine 7 is transmitted from the solid shaft 13 to the drive axle and thus to at least one drive wheel of the motor vehicle via the gearwheel 17, the gearwheel 26, which in this shifted position is secured to the main shaft 22 so as to rotate with it, the main shaft 22, the pair of gearwheels 30, 31 and the output shaft 6.

In the meantime, the next desired gear speed is pre-selected in the second component transmission 4, and in this case is the gear speed two with the gear 21. The gearwheel 25 is secured on the main shaft 22 by a corresponding shifting sleeve after synchronization of the rotational speed of the gearwheel 25 with that of the hollow shaft 18. The electric machine 9 advantageously can assist the synchronization here. However, there still is no torque transmitted from the clutch 12 to the hollow shaft 18 since the double clutch 5 permits only optional closing of the first clutch 11 or the second clutch 12. In the event of a change of gear speed, for example from the first gear speed into the second gear speed, the first clutch 11 opens, while the second clutch 12 closes. The power flux from the clutch housing 36 of the double clutch 5 to the hollow shaft 18 of the second component transmission is produced. Shifting therefore is possible without an interruption of tractive force. The electric machine 9 is connected operatively to the gearwheel 25 of the second gear speed of the second component transmission 4, irrespective of the position of the double clutch 5, via the gear drive 8, which is arranged rotatably on the output shaft 6. The gearwheel 25 is engaged with the fixed gear 21, and hence the torque of the electric machine can be transmitted to the hollow shaft 18. Given a corresponding shift position, a parallel operating mode of the electric machine 9 and the internal combustion engine 7 therefore is possible. The torque of the electric machine 9 can then be transmitted to the main shaft 22 via the gearwheel 25 or via the gearwheel stages 20, 24; 19, 23.

An operative connection of the electric machine 9 to the fixed gears 16, 17 of the first component transmission 3 also is possible via the freely moving gears 26, 27, but the transmission ratios in this case are less advantageous. Furthermore, a connection to the second component transmission 4 is advantageous in that the first gear speed, which generally is used to start the vehicle, can be pre-selected without deactivating the electric machine 9. Thus, a speed advantage is obtained when starting the motor vehicle. The gear drive 8 is arranged on the output shaft 6, which is present in any case. The gearwheel 21 of the second gear speed is structurally difficult to reach because of its small external diameter, but can be reached comfortably via the gearwheel 25, which is engaged therewith. The transmission ratio of the electric machine 9 with respect to the second component transmission 4 is defined by the ratio of the maximum rotational speed of the internal combustion engine 7 with respect to the maximum rotational speed of the electric machine 9. The gear drive 8 can have a planetary gear mechanism 38 arranged coaxially with either the output shaft 34 of the electric machine 9 or the output shaft 6. Thus, a very large range of transmission ratios can be achieved with a small axial installation space.

Figure 4:
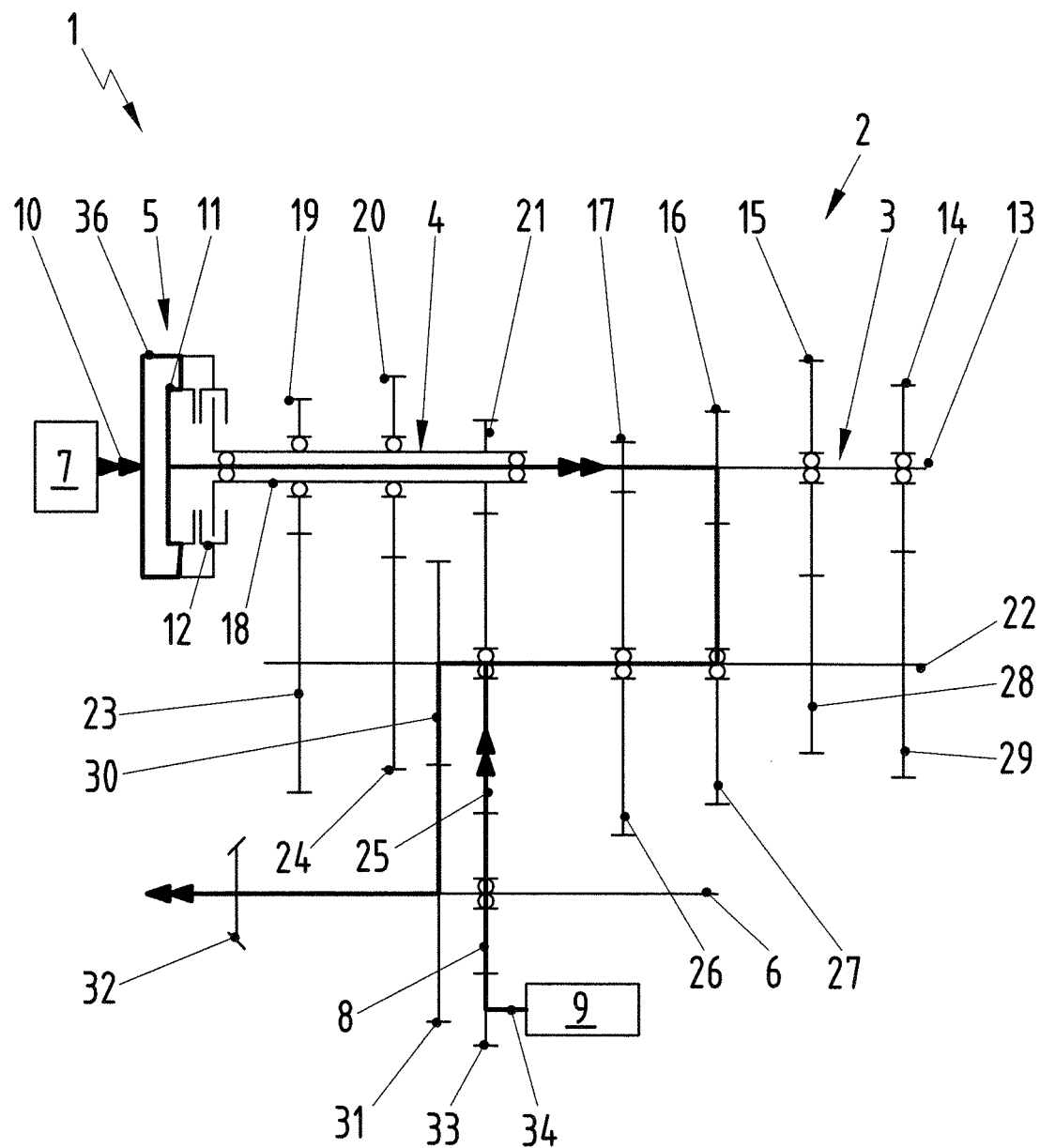
FIG. 4 shows a first exemplary operating state of the drive system of FIG. 1.

FIG. 4 shows a first exemplary operating state of the drive system 1. The first clutch 11 is closed and the third gear speed in the first component transmission 3 is engaged. For this purpose, the gearwheel 27 is secured on the main shaft 22 via the corresponding shifting sleeve. The second gear speed in the second component transmission 4 is engaged and the gearwheel 25 is secured on the main shaft 22. A torque applied by the internal combustion engine 7 is indicated by the thick line and is transmitted to a drive shaft of the motor vehicle, and therefore to at least one vehicle wheel, from the output shaft 10 of the internal combustion engine 7 via the clutch housing 36, the first clutch 11, the solid shaft 13, the gearwheel pair 16, 27, the main shaft 22, the gearwheel pair 30, 31, the output shaft 6 and the bevel gear 32. Parallel to this, a torque of the electric machine 9, which is operated as an electric motor, is transmitted to the main shaft 22 via the output shaft 34 of the electric machine 9, the gearwheel 33, the gear drive 8 and the gearwheel 25. Thus, the internal combustion engine 7 and the electric machine 9 operate cumulatively. Alternatively, the electric machine 9 also can operate as a generator in the operating state shown, for example, to charge an electric energy store.

Figure 5:
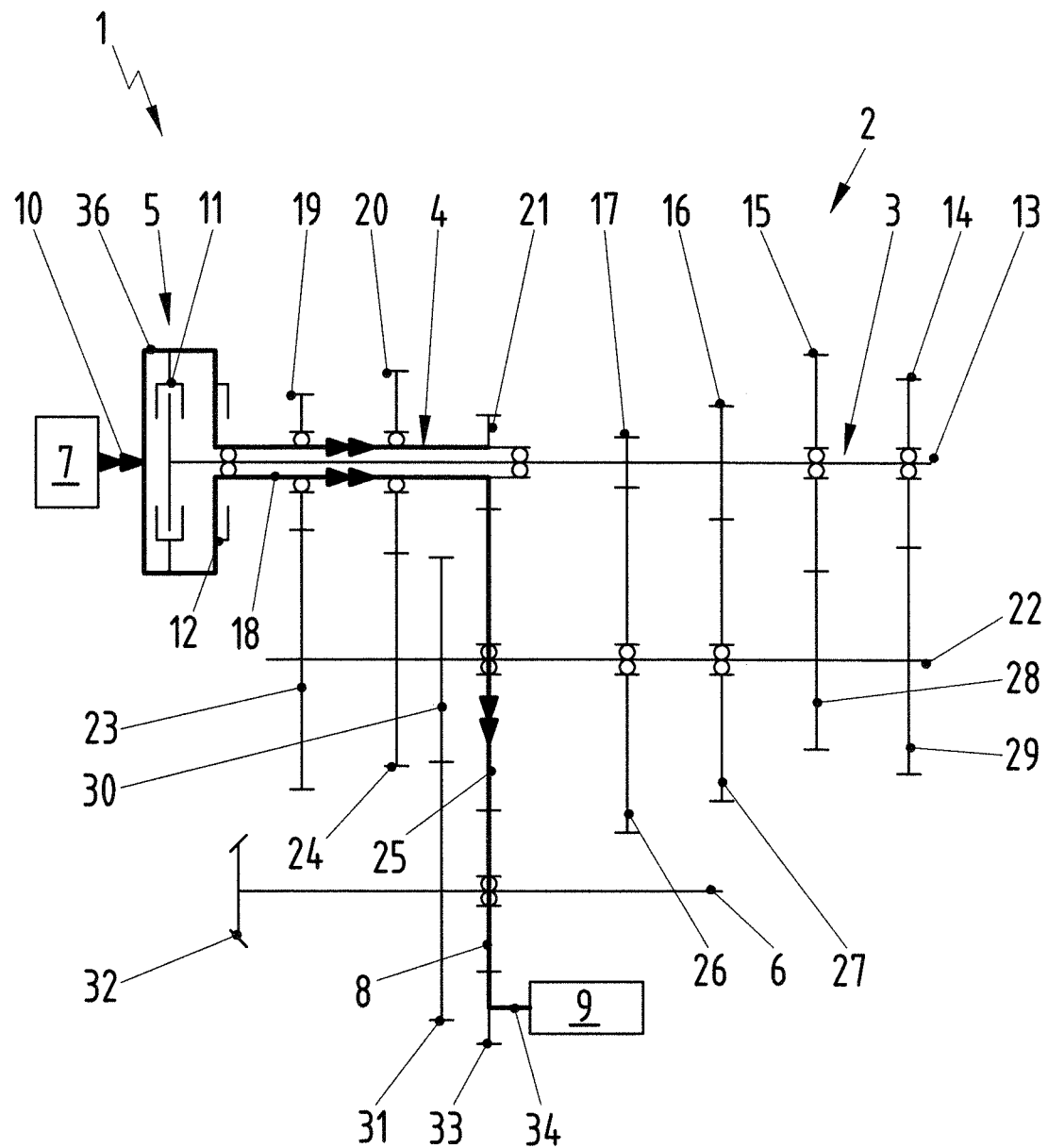
FIG. 5 shows a second operating state of the drive system of FIG. 1.

FIG. 5 shows a second operating state of the drive system 1. No gear speed of the double clutch transmission 2 is engaged, i.e. no torque is being applied to the output shaft 6. The second clutch 12 is closed and the electric machine 9 operates in the generator mode. A torque (illustrated by the thick line) is transmitted to the output shaft 34 of the electric machine 9 from the output shaft 10 of the internal combustion engine 7 via the clutch housing 36, the second clutch 12, the hollow shaft 18, the gearwheel 21, the gearwheel 25, the gear drive 8 and the gearwheel 33. The electric machine 9 therefore is connected operatively to the internal combustion engine 7 without setting in motion a vehicle equipped with the drive system 1. The electric machine 9 generates electrical energy that can be stored in an energy store. This operating state is assumed, for example, to charge the electric energy store during a waiting phase of the motor vehicle at a traffic light. Alternatively, the internal combustion engine 7 can be started by the electric machine 9 in this operating state when the electric machine 9 is operated as an electric motor, and therefore when there is a reversed torque profile. An additional starter for the internal combustion engine 7 therefore advantageously can be avoided.

Figure 6:
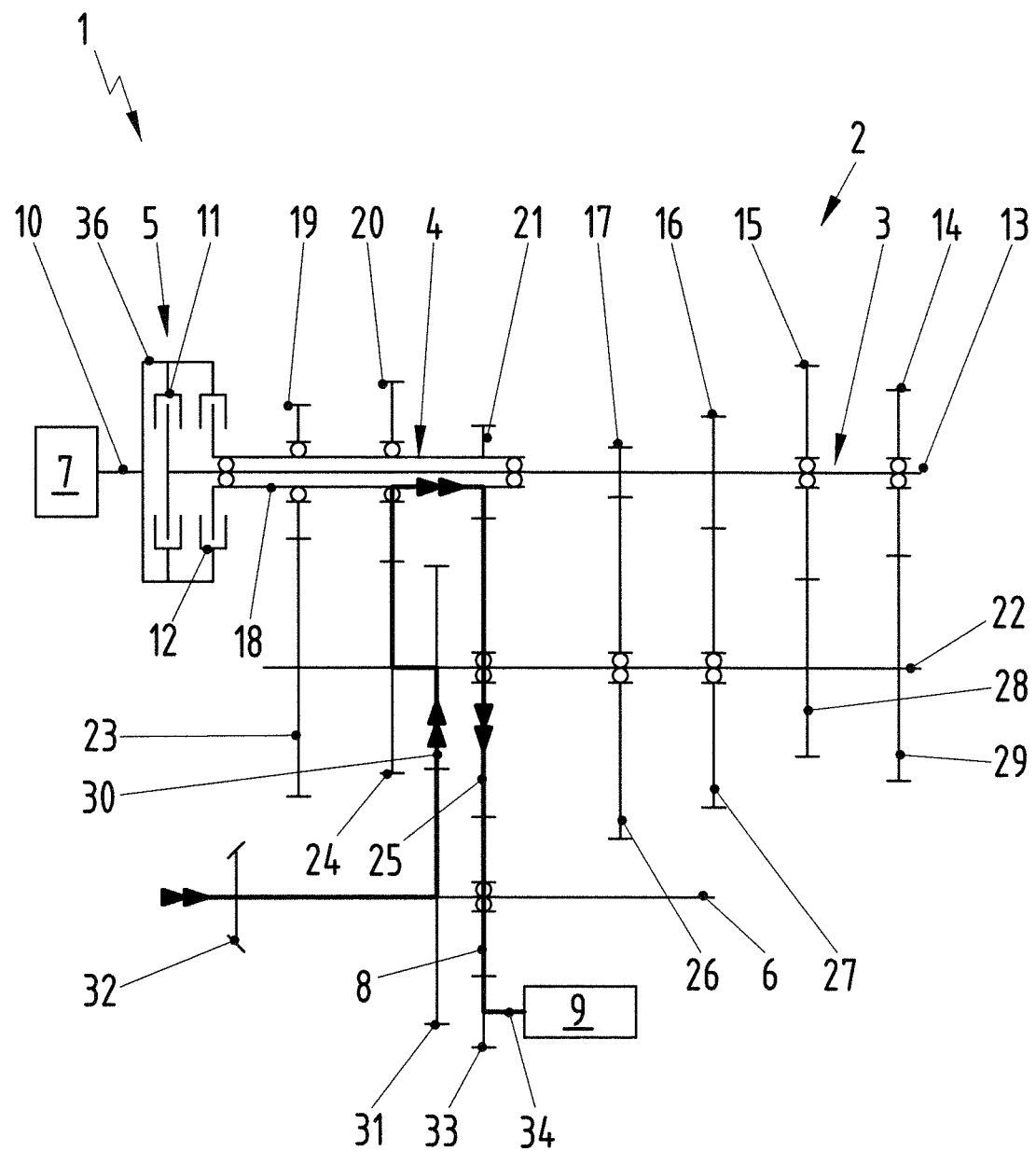
FIG. 6 shows a third operating state of the drive system of FIG. 1.

FIG. 6 shows a third operating state of the drive system 1 where both clutches 11, 12 are opened so that the internal combustion engine 7 is decoupled from the double clutch transmission 2. In the second component transmission 4, for example the sixth gear speed is shifted. Alternatively, the gear speeds two or four can be shifted. For this purpose, the gearwheel 20 of the sixth gear speed is secured on the hollow shaft 18 via the associated shifting sleeve. A torque (illustrated by the thick line) is transmitted to the output shaft 34 of the electric machine 9 from the bevel gear 32 via the output shaft 6, the pair of gearwheels 30, 31, the main shaft 22, the gearwheel 24, the gearwheel 20, the hollow shaft 18, the gearwheel 21, the gearwheel 25, the gear drive 8 and the gearwheel 33. The electric machine 9 operates here in the generator mode to recover braking energy of the vehicle. In this context, kinetic energy of the vehicle first is converted into kinetic rotational energy of the rotating parts of the double clutch transmission 2 via the vehicle wheels and the drive shaft, and then into electrical energy via the electric machine 9. The vehicle is braked by means of the electric machine 9 operating as a generator. One of the gear speeds two, four or six of the second component transmission 4 is selected depending on the velocity of the vehicle and the desired transmission ratio.

What is claimed is:

1. A drive system for a motor vehicle, having:
    a double clutch transmission with first and second component transmissions, a double clutch, a main shaft parallel to and not coaxial with the component transmissions and an output shaft parallel to and not coaxial with the main shaft and parallel and not coaxial with the component transmissions;
    an internal combustion engine operatively connectable selectively to one of the component transmissions via the double clutch to drive the output shaft;
    a gear drive rotatably arranged on the output shaft; and
    an electric machine parallel to and not coaxial with the output shaft and operatively connectable via the gear drive to at least one fixed gear of one of the component transmissions to drive the output shaft or to recover kinetic energy from the drive system, the electric machine further being operatively connectable to the internal combustion engine to drive the internal combustion engine.

2. The drive system of claim 1, wherein the gear drive has a spur gear.

3. The drive system of claim 1, further comprising a clutch device for decoupling the electric machine from the drive system.

4. The drive system of claim 1, wherein the first component transmission has gearwheels for uneven-numbered gear speeds of the double clutch transmission.

5. The drive system of claim 4, wherein the second component transmission has gearwheels for even-numbered gear speeds of the double clutch transmission.

6. The drive system of claim 5, wherein the electric machine is connectable operatively to the second component transmission.

7. The drive system of claim 1, wherein the gear drive has a planetary gear mechanism.

8. The drive system of claim 7, wherein the planetary gear mechanism is arranged coaxially with an output shaft of the electric machine.

9. The drive system of claim 7, wherein the planetary gear mechanism is arranged coaxially with the output shaft of the double clutch transmission.

10. A method for operating a drive system of a vehicle that has a double clutch transmission with two component transmissions, a double clutch and an output shaft, comprising:
   operatively connecting an internal combustion engine to one of the component transmissions via the double clutch to drive the output shaft via the internal combustion engine during a first set of operating conditions;
   operatively connecting an electric machine to at least one fixed gear of one of the component transmissions via a gear drive that is arranged rotatably on the output shaft to drive the output shaft via the electric machine during a second set of operating conditions;
   operatively connecting the electric machine to the at least one fixed gear of the one of the component transmissions via the gear drive that is arranged rotatably on the output shaft to recover kinetic energy from the drive system during a third set of operating conditions; and
   operatively connecting the electric machine to the internal combustion engine for starting the internal combustion engine.

11. The method of claim 10, characterized in that the electric machine is operatively connected to a fixed gear of the component transmission which has even-numbered gear speeds of the double clutch transmission.

12. The method of claim 10, characterized in that the electric machine is operatively connected to the fixed gear via a spur gear and/or via a planetary gear mechanism.

* * * * *